(No Model.)  2 Sheets—Sheet 2.
W. H. HUNT.
RAILWAY SIGNAL LAMP.
No. 354,142. Patented Dec. 14, 1886.
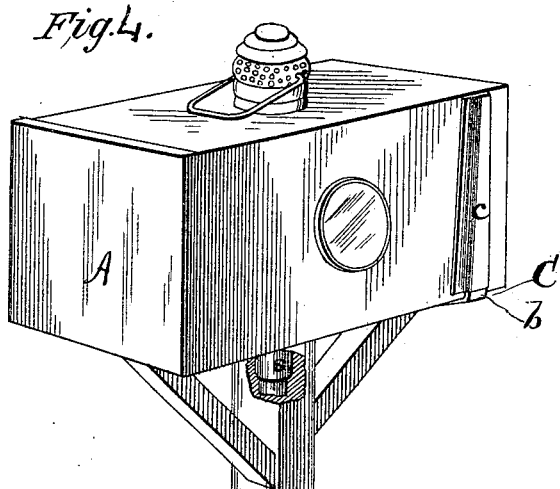
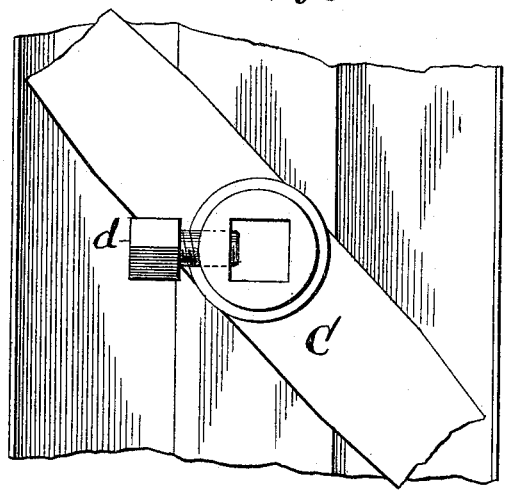
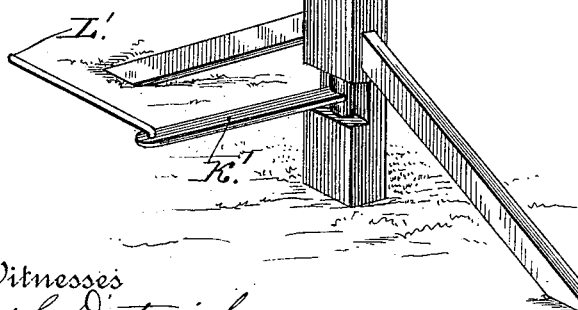

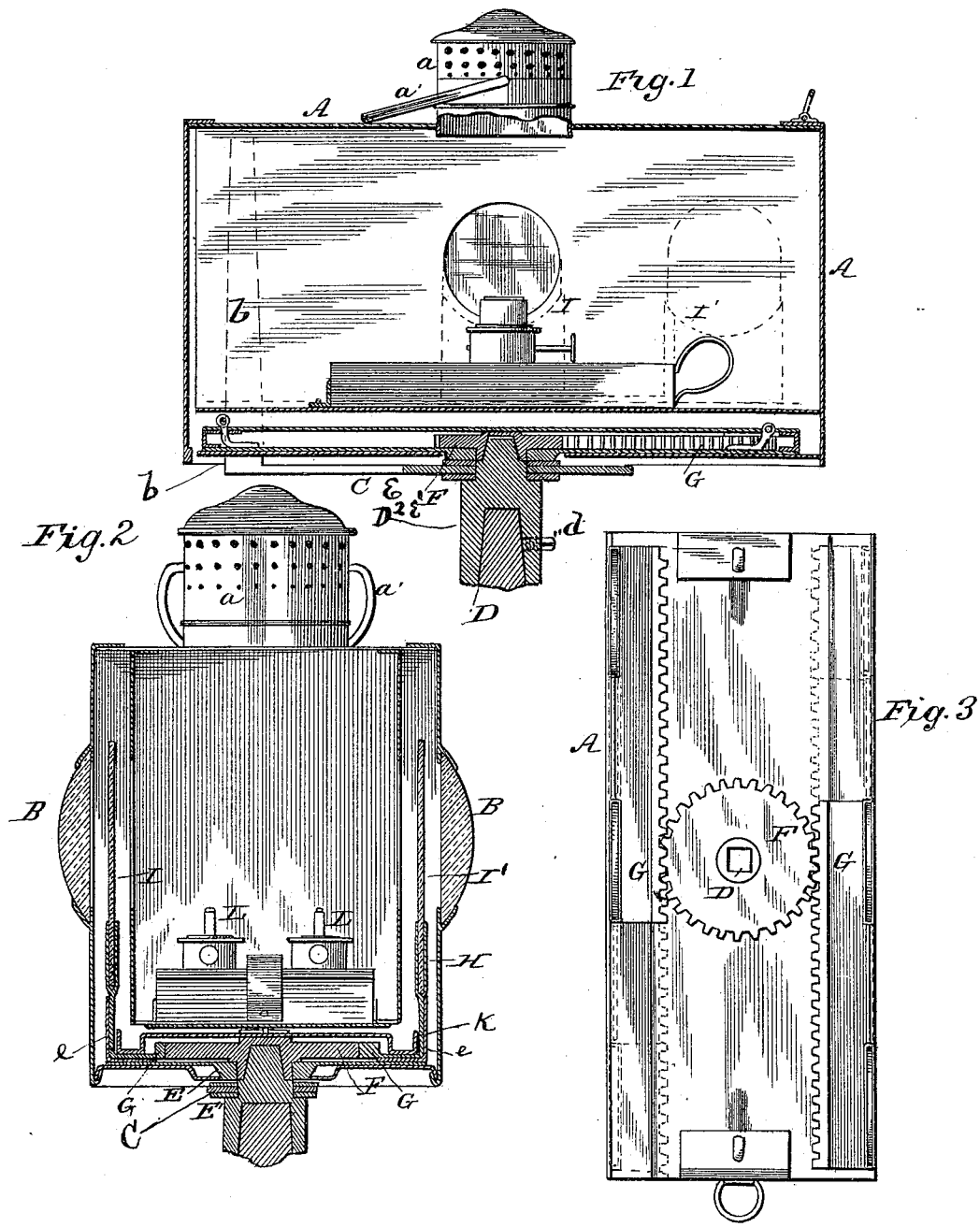

UNITED STATES PATENT OFFICE.

WILLIAM HENRY HUNT, OF EMPORIA, KANSAS.

RAILWAY SIGNAL-LAMP.

SPECIFICATION forming part of Letters Patent No. 354,142, dated December 14, 1886.

Application filed January 11, 1886. Serial No. 188,276. (No model.)

*To all whom it may concern:*

Be it known that I, WILLIAM HENRY HUNT, a citizen of the United States of America, residing at Emporia, in the county of Lyon and State of Kansas, have invented certain new and useful Improvements in Signal-Lamps and Methods of Showing Different-Colored Lights in Same; and I do hereby declare the following to be a full, clear, and exact description of the invention, such as will enable others skilled in the art to which it appertains to make and use the same.

My invention consists of a stationary light or lights with movable colored glasses in front thereof, said glasses being moved by the movement of the target-shaft, and of other devices and combinations, all of which will be understood by the following description and claims.

In the accompanying drawings, Figure 1 is a vertical longitudinal section of my signal-light, including the cage and target-shaft thereof. Fig. 2 is a vertical transverse section of the same. Fig. 3 is a top view of the cog-gear wheel and cog-bars for moving the colored glasses as the switch is moved. Fig. 4 is a perspective view, partly in section; and Fig. 5 is a detail view of shaft attachment.

Referring to the drawings, A represents a vertical side section of the cage or box containing the various parts of my signal-light. Two oval glass lenses, B B, are secured in the side walls of cage A, through which rays of light are concentrated and transmitted to an approaching object from one or more lamps placed within said cage, as shown at Fig. 2. The cage A is provided with top perforated cap, $a$, bail $a'$, and a removable end door for access to the interior.

A stirrup or base rest, C, formed of metal and provided with arms $b$, extends at right angles upward, the center formed with an opening to fit around a central operating-cap, $D^2$, said cap having a side opening, into which is inserted a set-screw, $d$. Cap $D^2$ also has a central angular opening formed to admit an operating-shaft, D, which is held in place by set-screw $d$. Shaft D has secured near its base a horizontal projecting arm, K, the outer end of which is connected to a switch-rod, $L'$, that may be connected to the switch-rails, as desired. Said shaft D may be incased in a hollow casing, B', as shown in Fig. 5, or be held vertically by any other suitable means. Arms $b$ of stirrup C enter sleeves or loops $c$, formed in the sides of cage A near its ends, the purpose of which is to hold the cage steady, aid in its support, and prevent turning when the shaft D is rotated. Stirrup C crosses the bottom of cage A diagonally, as shown in Fig. 6, and the arms $b$ pass into loops $c$ on opposite sides of the cage. Two washers, E E', clamp stirrup C over the cap $D^2$. The top of cap $D^2$ is formed square and secured centrally to a gear-wheel, F, that meshes or gears with sliding cog-bars G, as shown in Fig. 3, by means of which said bars are moved longitudinally within cage A near the bottom. Said slides are held loosely in place by suitable keepers or clamps, $e\ e$. Cog-bars or rack-bars G are formed with upwardly-projecting sides at right angles with their top surface, said sides terminating in flanges forming sockets H, into which different-colored glasses I I are inserted and held, as shown in Fig. 2. A shield, K, formed of metal and with angular upturned edges to rest on the rack-bar G, is inserted in the cage A under the lamp-tray and above the gear-wheel F, to protect said wheel and rack-bars, and to allow of their free movement.

Lamps L L are placed on a sliding tray within the cage A, in position that the flames of the same will appear near the center of the lenses I' I'. In operation the cage A is held still by being placed with the stirrup C fastened to an upright or braces from the post to the cage, as shown in Fig. 5. When the switch is moved, shaft D is rotated by means of rod $L'$ and lever K. When the gear-wheel F moves the rack-bars G, carrying the colored-glass slides in front of the lamps L L, a colored light is shown as a danger-signal to approaching trains; a reverse motion reverses the glass slides and leaves a clear light. If the shaft D is held rigid and the cage A turned partly round, the same effect is produced.

I claim—

1. A railway-signal consisting of a lamp-cage secured to an upright and connected by a rotary shaft, lever-arm, and rod to switch-rails or switch-bar, said lamp-cage having within colored-glass slides held by metal rack-bars and connected by cog-gear to said shaft, substantially as and for the purpose set forth.

2. The cage A, having oval side lenses, the lamp L, the sliding colored glasses I I, the stirrup C, the washers E E', the gear-wheel F, and the rack-bars G, in combination with the rotary shaft D and connection with a suitable upright, all arranged and operated substantially as shown.

In testimony whereof I affix my signature in presence of two witnesses.

WILLIAM HENRY HUNT.

Witnesses:
ED BOLLARD,
JOHN A. HILLERMAN.